Feb. 28, 1956  R. E. LOOMANS  2,736,470
FERTILIZER DISTRIBUTOR
Filed Feb. 1, 1955

INVENTOR.
ROBERT E. LOOMANS
ATTORNEYS

United States Patent Office 2,736,470
Patented Feb. 28, 1956

2,736,470

FERTILIZER DISTRIBUTOR

Robert E. Loomans, Mayville, Wis., assignor to John Deere Van Brunt Company, Horicon, Wis., a corporation of Wisconsin Application February 1, 1955, Serial No. 485,550

4 Claims. (Cl. 222—559)

The present invention relates generally to agricultural implements and more particularly to material-dispensing implements, such as fertilizer distributors, for example, constructed and arranged to be drawn across the field or other area for the purpose of distributing material.

The object and general nature of the present invention is the provision of means in the nature of quick-detachable and attachable mechanism for holding a longitudinally shiftable slide that forms a part of a fertilizer hopper or the like in which the effective size of the discharge openings is controlled by the position of the slide, the latter being movable longitudinally of the hopper to different positions to provide for different rates of discharge of the material from the hopper.

In the case of fertilizer distributors, with which the present invention is particularly adapted to be used, it is quite desirable to provide for cleaning out the machine, as at the end of a run, or the end of a day, so as to prevent any fertilizer remaining in the hopper from hardening and strongly adhering to the slide and other parts of the machine. More specifically, therefore, the present invention contemplates the provision of means in the form of slide-holding arms swingably mounted on the hopper and adapted to engage the bottom portion of a discharge-controlling slide for the purpose of holding the latter in proper position relative to the hopper. According to the present invention, means is provided for quickly and easily disconnecting the arms from the associated holding means, whereby the arms are permitted to drop down and the discharge-controlling slide removable entirely as a unit from the hopper. It is also an important feature of this invention to provide means that is adjustable whereby different degrees of pressure can be brought into action for holding the slide up against the bottom of the hopper.

These and other objects and advantages of the present invention will be apparent to those skilled in the art after a consideration of the following detailed description of the presently preferred embodiment, taken in conjunction with the accompanying drawings in which the preferred embodiment has been shown by way of illustration.

Figure 1:
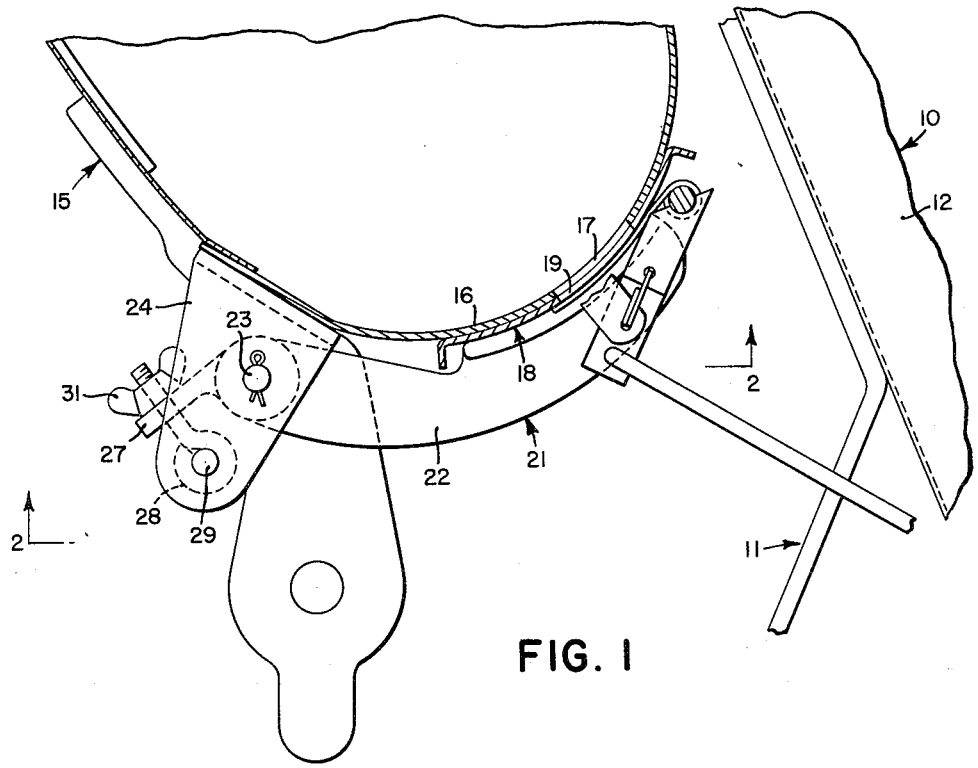
Fig. 1 is an end view of the hopper of a fertilizer attachment for a grain drill or the like, certain parts being broken away.
Figure 2:
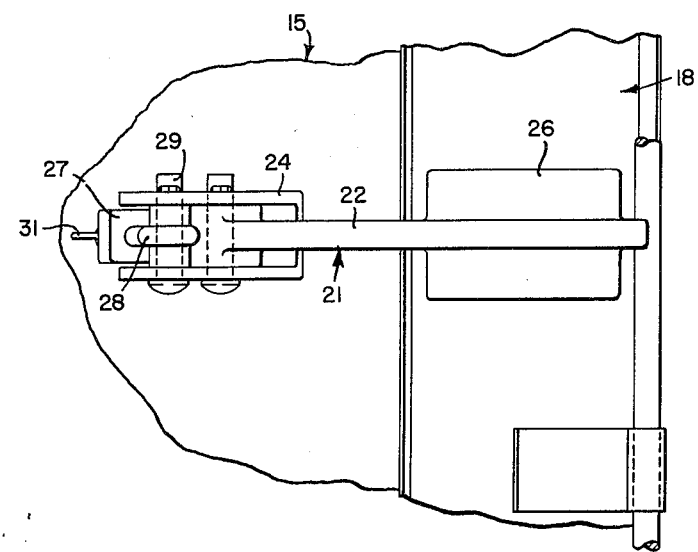
Fig. 2 is a bottom view, taken generally along the line 2—2 of Fig. 1.

Referring first to Fig. 1, which shows the principles of the present invention as incorporated in a fertilizer-type grain drill, the grain drill itself is indicated in its entirety by the reference numeral 10 and is shown only fragmentarily, the grain drill including a generally transversely extending frame 11 and including among other things a hopper 12. Through suitable means (not shown) the grain drill frame 11 supports a fertilizer hopper 15 that includes a rounded bottom section 16 having discharge openings 17 therein. The flow of fertilizer through the openings 17 is controlled by a slide 18 having flow controlling openings 19 and supporting along the underside of the hopper bottom 16. The means for supporting the slide 18 constitutes the principal portion of the present invention.

It has been found that present-day fertilizers, if left over night, for example, in a hopper or other dispensing apparatus, not infrequently harden and cake so that when an attempt is made the next day to use the implement, the cakes of hardened fertilizer seriously interfere with the proper operation. Accordingly, one of the features of the present invention is the provision of means to support the slide 18 in the proper position but which is so constructed and arranged that it is a very simple and convenient operation to drop the slide 18 away from the hopper itself to provide for cleaning the slide and other parts of the hopper.

According to the present invention, I provide a plurality of slide holders 21, each in the form of a lever 22 pivoted on a pin 23 or the like carried by a bracket 24 that is fixed to the hopper 15. Preferably, each bracket 24 is in the nature of a U-shaped part secured, as by rivets or the like, to the rear lower wall of the hopper 15. The forward end portion of each lever 22 is provided with lateral extensions 26 that provide a firm and secure contact with the bottom face of the slide 18, and the other end of each lever 22 is provided with an apertured section 27 that receives the threaded end of a swing bolt 28 that is swingably mounted on a pin 29 or the like carried at the outer end of the bracket 24. A wing nut 31 is disposed on each swing bolt 28.

As can best be seen from Fig. 1, tightening the wing nut 31 serves to press the opposite end of the associated lever 22 up against the slide 18. Therefore, by properly adjusting the wing nuts 31, the slide 18 may be held with the proper pressure against the bottom of the hopper. When it is desired to drop the slide 18 down for cleaning or other purposes, it is a simple matter to remove the several wing nuts 31, whereupon the slide-engaging portions of the several levers 22 are free to drop down, releasing the slide and permitting its complete removal from the machine for cleaning or other purposes.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a fertilizer distributor including a hopper having discharge openings in the bottom portion thereof, a discharge control gate slidably disposed along the underside of said hopper, a plurality of levers pivotally connected with said hopper bottom and each including an end portion having slide-engaging means, and means connected with the other end portion of each of said levers for forcing said first-mentioned end portion against the slide to hold the latter against the hopper bottom.

2. The invention set forth in claim 1, further characterized by the slide-engaging portion of each of said levers being extended laterally and shaped to contact the bottom face of said slide substantially from one edge to the other thereof.

3. In a fertilizer distributor, a hopper having discharge openings in the bottom portion thereof, a slide having cooperating openings and disposed along the underside of the bottom of the hopper for controlling the flow of fertilizer through said openings, a plurality of brackets fixed to the hopper bottom adjacent one edge of the slide, a plurality of slide-holding levers pivotally connected, respectively, with said brackets and each lever including a slide-holding section, and means connected with the opposite end of each of said levers for urging said slide-engaging sections upwardly to hold said slide against the hopper bottom.

4. The invention set forth in claim 3, further characterized by said last-mentioned means including a swing bolt carried by each bracket and a cooperating apertured portion on the associated lever receiving said swing bolt No references cited.